United States Patent [19]
Mioduski

[11] 3,882,318
[45] May 6, 1975

[54] DETECTOR MEANS FOR AN AUTOMATIC CHEMICAL TESTING APPARATUS

[75] Inventor: George Tadeusz Mioduski, Bellaire, Tex.

[73] Assignee: Hycel, Inc., Houston, Tex.

[22] Filed: Jan. 21, 1974

[21] Appl. No.: 435,227

[52] U.S. Cl. ............... 250/576; 356/184; 356/39; 23/253 R
[51] Int. Cl. ............................................. G01n 21/26
[58] Field of Search ........... 250/564, 565, 239, 573, 250/576; 356/208, 180, 184, 173, 179, 39, 41; 23/253 R, 259

[56] References Cited
UNITED STATES PATENTS

| | | | |
|---|---|---|---|
| 3,035,481 | 5/1962 | Jones et al. | 250/573 X |
| 3,544,225 | 12/1970 | Wattenburg et al. | 356/39 |
| 3,551,062 | 12/1970 | Brown | 250/576 X |
| 3,628,039 | 12/1971 | Ochs et al. | 250/239 |
| 3,800,147 | 3/1974 | Shea et al. | 250/564 |

FOREIGN PATENTS OR APPLICATIONS

| | | | |
|---|---|---|---|
| 908,050 | 10/1962 | United Kingdom | 250/564 |

*Primary Examiner*—Walter Stolwein
*Attorney, Agent, or Firm*—Harry W. Barron; Timothy L. Burgess

[57] ABSTRACT

There is disclosed a cylindrical polygon radiant energy housing with selected polygon sides having an indention therein. A detector housing having a printed circuit board affixed thereto is coupled to each of selected polygon sides of the source housing at the indentions therein to form a testing chamber. Two radiant energy paths exist between the source and each chamber so formed. On the printed circuit board ia a radiant energy detector for detecting the presence of an object in the chamber so formed and a second radiant energy detector for detecting the transmittance of radiant energy of a specific wavelength through the contents of said chamber. Each housing further includes two holes therethrough and each detector is positioned to be aligned with a hole, which, in turn, is aligned with a radiant energy path.

22 Claims, 4 Drawing Figures

PATENTED MAY 6 1975　　3,882,318
FIG. 2.
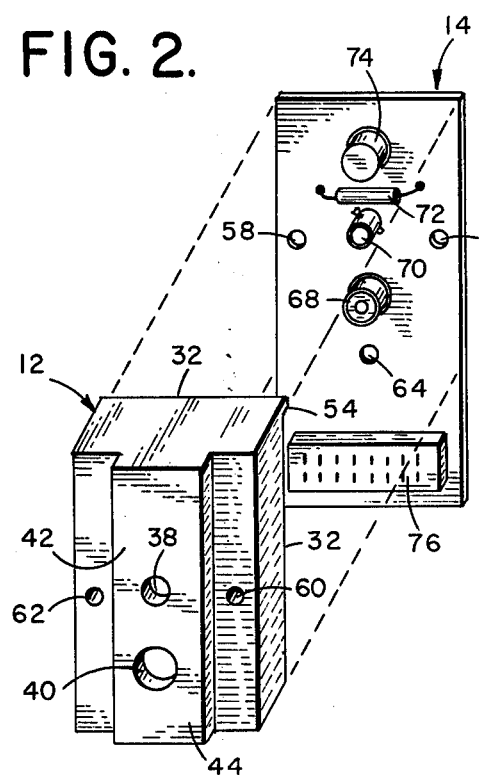
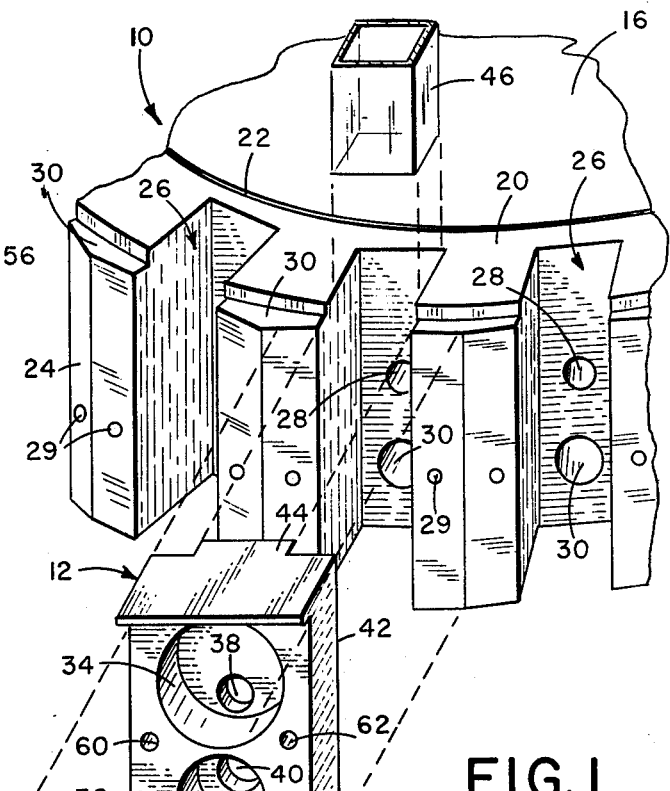
FIG. 1.
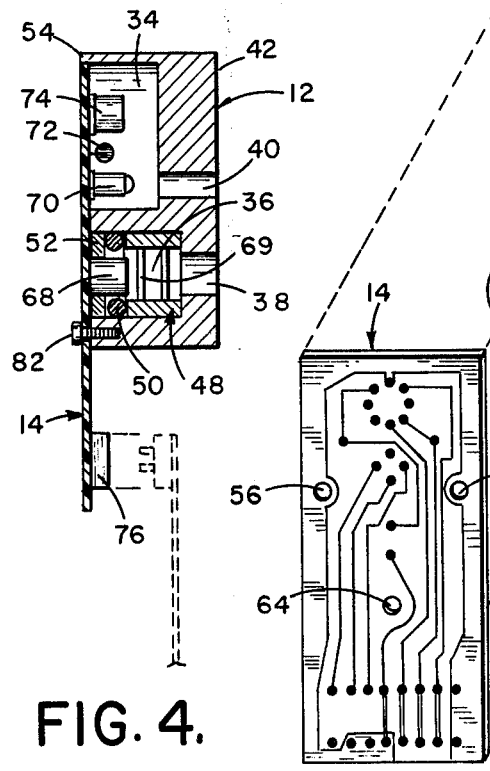
FIG. 4.
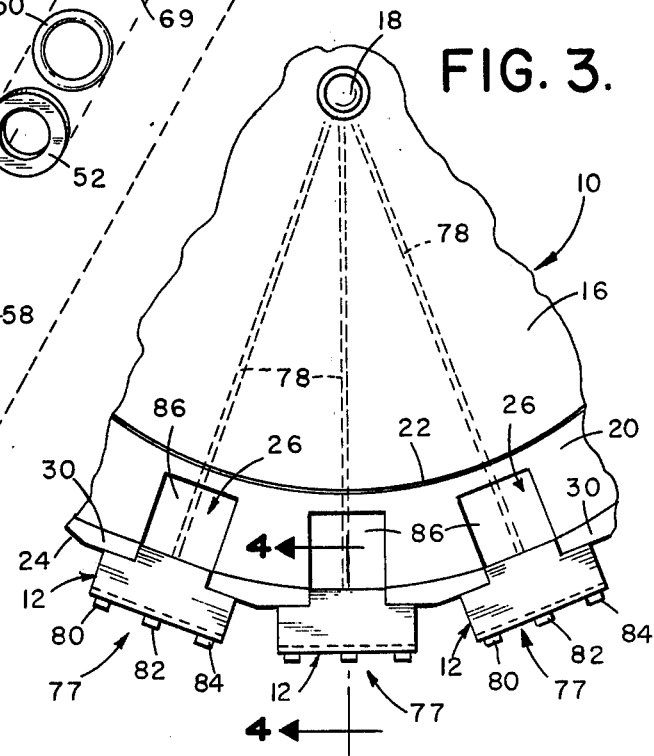
FIG. 3.

3,882,318

DETECTOR MEANS FOR AN AUTOMATIC CHEMICAL TESTING APPARATUS

This invention relates to automatic chemical testing apparatus and more particularly to apparatus containing a source of radiant energy and means for applying said radiant energy through a chamber formed by said apparatus and detector means affixed thereto.

In the prior art, many automatic chemical testing machines exist for performing tests on things such as bodily fluids in an automatic manner. These machines have revolutionized the medical testing laboratory to such an extent that performing tests manually is becoming less and less frequent. However, such automatic chemical testing machines have drawbacks. One of the drawbacks is their great expense. A second drawback is that a considerably amount of time is required to prepare the machines to begin testing. However, once prepared, the machines can continually perform tests such that the total output during a working day greatly exceeds that performed by manual methods. However, because of the great cost of these automatic machines and the time required to initially prepared them for operation, a sufficient volume of tests must be run before they become economically feasible for inclusion as laboratory equipment.

There are many situations in which the volume of tests to be run is insufficient to economically support a fully automatic chemical testing machine typified by the prior art. Examples of such situations include a physician's office or a group of physicians' office where blood tests of office patients are desired but not in sufficient quantity to warrant a prior art type automatic chemical testing machine. Another example of a situation where an insufficient volume of tests exists is in a hospital emergency room where results are desired as soon as possible, but at infrequent intervals, especially during the low volume hours in the middle of the night. Thus, there exists a need for a smaller, less expensive and less complicated automatic chemical testing machine which is simple to operate and prepare for operation. The reason for the requirement that the machine be simple to operate is that in the situations referred to above, it is not economical to maintain a full-time medical technologist or other skilled operator to operator the machine. Rather, for example, in the situation of the doctor's office, either the doctor himself or his nurse would, of necessity, operate the machine.

One manner of eliminating much of the expense and complications involved in the prior art automatic chemical testing machines is to eliminate the bulk storing of reagents and dispensing of specimen and reagents into various channels for which tests are to be performed. Of course it is still necessary to utilize reagents, but these may be utilized by providing them in pre-packaged containers into which a given amount of specimen, such a blood serum, or other body fluid or substance being tested, is manually inserted. After this is done, the package containing the reagent-specimen mixture is inserted into the testing apparatus and a test automatically performed thereon.

On such inexpensive and simple automatic chemical testing apparatus is described in United States Patent Application Ser. No. 406,258 entitled "Automatic Chemical Testing System" in the names of John J. Moran, Suerre Wolff and Holvor W. Ashley and assigned to the present assignee hereof. In the automatic chemical testing apparatus described in that patent application, the prepared mixture of specimen and reagent is inserted into the proper channel chamber of the testing apparatus and the transmittance of radiant energy of a specific wavelength through the mixture is measured at appropriate times after the insertion. In the testing apparatus described in that patent application, it is necessary to provide a timing signal each time a container is inserted into one of the chambers. In addition, each of the chambers necessarily must include means for having radiant energy applied therethrough to a photosensitive means to measure the amount of radiant energy transmitted through the mixture of the inserted container.

In accordance with one preferred embodiment of this invention there is provided an automatic chemical testing apparatus in which a specimen to be tested and a reagent are mixed in a reaction vessel and placed in a reaction chamber partially formed in a reaction block, the improvement comprising first and second radiant energy paths from the source through the reaction chamber. In addition there is provided first radiant energy detection means for providing a signal manifesting the amount of a specific wavelength of radiant energy applied thereto and second radiant energy detection means for providing a signal whenever the amount of radiant energy applied thereto is less than a specific amount. Finally, there is provided detector holding means affixed to the block to complete the formation of the chamber for holding the first and second detection means in alignment with the respective first and second paths.

A detailed description of one preferred embodiment of this invention is hereinafter given with specific reference being made to the following FIGURES in which:

FIG. 1 is a fragmentary view showing the optical system of the automatic chemical testing apparatus;

FIG. 2 is a fragmentary view showing the other side of certain elements shown in FIG. 1;

FIG. 3 is a top view of a portion of the assembled apparatus shown in FIG. 1; and FIG. 4 is a cross-sectional view taken along lines 4—4 of FIG. 3.

Referring now to FIG. 1, there is shown a fragmentary view of the heating and radiant energy source housing apparatus 10, detector housing 12, and printed circuit board 14, which constitute the chamber forming and detection portion of the automatic chemical testing apparatus described in the above mentioned Moran et al. Patent Application Ser. No. 406,258. Apparatus 10 includes a cylindrical block 16 which houses a source of ultra-violet and visible radiant energy, such as an xenon lamp 18, shown in FIG. 3. Block 16 is maintained at a constant temperature of, for instance, 37°C or body temperature by means not shown. Surrounding block 16 is a sleeve 20 which has an inner side 22 in the shape of a cylinder and an outer side 24 in the shape of a cylindrical polygon. Selected ones, which may be all, of the polygon side of outer side 24 of sleeve 20 have an indention 26 machined therein. Indention 26 has three sides at right angles to one another and an open front side. There are two holes 28 and 30 or other radiant energy carrying means from the back side of each indention 26 to the source of radiant energy 18. Each of the holes 28 and 30 serve as a radiant energy path from the source 18 to each of the indentions 26 such that light is applied from the source 18 into parallelepiped reaction chamber formed in the indention when a detector housing 12 is affixed to a polygon side of sleeve 20.

On each of the polygon sides of the outer side 24 of sleeve 20 are two holes 29 each positioned near the intersection of two polygon sides into which may be fastened a threaded member, such as a bolt. In addition, sleeve 20 has a removed portion 30 on the top side of each finger formed by adjacent indention 26 which serve to position a cover (not shown) of the package into which the apparatus shown in FIG. 1 fits.

Each of the indentions 26 in sleeve 20 for which a radiant energy reading is desired has a detector housing 12 associated and affixed thereto. In FIG. 1 for the sake of clarity, only one such detector housing 12 is shown, although it is understood that identical detector housing 12 are associated with and affixed to each of indentions 26. On the front side 32 of detector housing 12 are first and second cylindrical openings 34 and 36, each of which has a hole 38 and 40 respectively therethrough to the other side 42 of housing 12. The holes 38 and 40 are positioned on housing 12 so that when housing 12 is affixed to sleeve 20, the holes 38 and 40 are in alignment with the holes 28 and 30 in the particular indention 26 to which housing 12 is affixed. On the other side 42 of housing 12 is a portion 44 extending therefrom so that housing 12 has a "T" shape configuration. The portion 44 is of such size that it fits into the indention 26 when housing 12 is affixed to sleeve 20 to form the fourth side of the parallelepiped reaction chamber.

The side of extending portion 44 and the three sides of indention 26 form a four-sided parallelepiped testing chamber having a bottom consisting of the base (not shown) upon which apparatus 10 rests an an open top into which a testing container 46 may be inserted. As previously mentioned, block 16 and hence, sleeve 20, are held at a constant temperature of, for instance, 37°C or body temperature, and hence, when container 46 is placed in the testing chamber, the contents thereof will be that temperature. It will be assumed that the testing chamber formed by affixing housing 12 to sleeve 20 is dedicated to performing a given test and only that test. Accordingly, testing container 46 contains a reagent for that specific test and a predetermined amount of the sample of the specimen being tested.

A given time after container 46 containing the reagent-specimen mixture is placed into the chamber formed by detector housing 12 and sleeve 20, the mixture in container 46 will absorb a certain amount of a certain wavelength of radiant energy, which may be either visible or ultra-violet radiant energy depending upon the particular test being performed. The amount of the radiant energy absorbed depends upon the amount of the substance being tested which exists in the reagent-specimen mixture in container 46. Thus, to determine the amount of the substance, the amount of the absorption of that certain wavelength radiant energy must be determined. This, in turn, may be accomplished by detecting the amount of radiant energy transmitted through a blank chamber, that is, a chamber with no container 46 inserted therein, and then by determining the logarithim of the ratio of these two values. This determined value is the amount of absorption and it may be conveniently converted to standard concentation units by using a proper scaling factor. For a more detailed description of the process of measuring the radiant energy absorption and converting it to concentration units using the automatic chemical testing apparatus, reference should be made to the above cited Moran et al Patent Application Ser. No. 406,258.

It is not sufficient to merely measure the absorption of radiant energy by the mixture in container 46 at any time. Rather, it is necessary to do so at a specific time after container 46 is inserted into the chamber formed by affixing housing 12 to sleeve 20. For this reason, some sort of a signal must be provided to indicate the insertion of container 46. This may be done by breaking the optical beam 28 provided from the source 18 through hole 28 to hole 38 in housing 12. To detect both the transmittance of the radiant energy through the mixture in container 46 and whether something is inserted between hole 28 and hole 38 to break the light path therebetween, radiant energy detector means are affixed to printed circuit board 14 on the side shown in FIG. 2. These components as well as other electrical components affixed to the side of circuit board 14 shown in FIG. 2, are inserted into the cylindrical openings 34 and 36.

As has previously been explained, the test for a particular substance in the specimen of the mixture in container 46 is performed by measuring the absorption of radiant energy of a specific wavelength. Thus, to measure this radiant energy it is necessary to measure the transmittance of the light of a particular wavelength through the mixture in container 46. To accomplish this, a radiant energy filter 48 is inserted in cylindrical opening 36 and is held in place by an O-ring 50. In addition, a spacer washer 52 is placed over O-ring 50 in cylindrical opening 36 to have an outer surface flush with the side 32 of housing 12. When filter 48, O-ring 50 and spacer washer 52 are inserted in opening 36, circuit board 14 is affixed beneath the lip 54 extending from the top perpendicular to side 32 of housing 12. Circuit board 14 is affixed to housing 12 by fastening bolts through holes 56, 58, 60 and 62 into respective holes 29 of the sleeve 20. In addition, a bolt is fastened through hole 64 into hole 66.

Referring now to FIG. 2, housing 12 and circuit board 14 are shown from the opposite side as shown previously in FIG. 1. Where possible like numerical designations are used in FIGS. 1 through 4. The side of circuit board 14 shown in FIG. 2 includes P-I-N diode 69, phototransistor 70, resistor 72 and amplifier 74. In addition, a connector 76 is included on an area of circuit board 14 which is below the bottom surface of housing 12 when circuit board 14 is affixed thereto. Phototransistor 70, resistor 72 and amplifier 74 are positioned in close proximity to one another so that when circuit board 14 is affixed to housing 12 they all are contained in opening 34 on the side 32 of housing 12. Phototransistor 70 is further positioned so that it is in alignment with hole 38. P-I-N diode 68 is positioned on circuit board 14 so that it fits into the centers of washer 52 and O-ring 50 in alignment with hole 40 when circuit board 14 is affixed to housing 12. Electrical components 68, 70, 72 and 74 on circuit board 14 are connected together, and, through connector 76 to other portions of the system, by printed wiring on the side of circuit board 14 shown in FIG. 1.

Referring now to FIG. 3, there is shown a portion of the testing apparatus including three test channels 77. A light path 78 exists beneath the surface of apparatus 10 from source 18 to each of the channels 77. Each of the channels 77 is formed by affixing a housing 12 to the sleeve 20 by the screws 80, 82 and 84 in the manner previously explained. By so doing, parallelepiped chambers having square openings 86 are formed into which containers 46 are inserted. Each of the channels 77 are used for testing a different specific substance and will test only that substance. Thus, whenever a test for a specific substance is to be performed, the specimen is mixed with a reagent for that specific substance in a container 46 and the container is inserted into square opening 86 of the channel 77 assigned to that substance. The filter 48 inserted in the housing 12 affixed to that channel is selected to have a wavelength for that particular substance. Further, the time at which the transmittance of light through the mixture in container 46 is measured is unique for each particular channel 77.

Referring now to FIG. 4, a cross-sectional view of circuit board 14 affixed to housing 12, taken through lines 4—4 in FIG. 3, is shown. From this view it is seen that the circuit elements 70, 72 and 74 fit in the opening 34 in housing 12 with phototransistor 70 in alignment with hole 40 and that the P-I-N diode 68 fits into opening 36 in the center of washer 52 and O-ring 50 so that the edge thereof is in close proximity to the surface 68 of filter 48 and in alignment with hole 38. Also shown in FIG. 4 is bolt 82 which is fastened into hole 66 through hole 64.

What is claimed is:

1. In automatic chemical testing apparatus in which a specimen to be tested and a reagent are mixed in a reaction vessel and placed in a reaction chamber formed in part in a reaction block, the improvement comprising:
   a source of radiant energy;
   first and second radiant energy paths from said source through said reaction chamber;
   first radiant energy detection means for providing a signal manifesting the amount of a specific wavelength of radiant energy applied thereto;
   second radiant energy detection means for providing a signal indicating the presence of said reaction vessel in said chamber whenever the amount of radiant energy applied to said second radiant energy detection means is less than a specific amount; and
   holding means, affixed to said block to complete the formation of said chamber, for holding said first and second detection means in alignment with said respective first and second paths.

2. The invention according to claim 1 wherein said first radiant energy detection means provides a signal manifesting the amount of a selected substance in said specimen, said substance being selected by the particular reagent used and the specific wavelength of light applied to said first radiant energy detection means.

3. The invention according to claim 1 wherein said holder means includes a member having first and second cavities therein, each of which has a hole therethrough, and a circuit board having components, including said first and second radiant energy detection means affixed thereto, said circuit board being affixable to said member, said first and second radiant energy detection means being positioned on said circuit board so that they are each in alignment with one of the holes through the cavities when said circuit board is affixed to said member.

4. The invention according to claim 3 wherein said holes in said cavities are positioned to be aligned with said respective radiant energy paths when said detector holder means is affixed to said block.

5. The invention according to claim 4 wherein at least some of the components other affixed to said circuit board are positioned thereon to be in a cavity when said circuit board is affixed to said member.

6. The invention according to claim 5 wherein a radiant energy filter for said specific wavelength is included in said cavity for which said first radiant energy detection means is positioned on said circuit board.

7. The invention according to claim 6 wherein said filter is held in position by an O-ring member and a spacer washer, said first radiant energy detection means being positioned on said circuit board to extend into the holes of said O-ring member and spacer washer.

8. The invention according to claim 1 wherein said first detector means is a P-I-N diode and said second detector means is a photo transistor.

9. In automatic chemical testing apparatus capable of performing a plurality of chemical tests on a specimen to determine the amount of different selected substances therein, each test being performed by mixing, in a separate reaction container, a predetermined amount of said specimen with at least one reagent selected for that test, by thereafter inserting each container in a chamber of said apparatus for that test, and, at a given time thereafter, by measuring the radiant energy at a wavelength specified for that test which is transmitted through that mixture, the improvement comprising:
   a source of radiant energy;
   radiant energy source housing means for containing said source at a position interior to the perimeter thereof, said perimeter having a plurality of cutaway portions selected ones of which are used to perform said tests, each cutaway portion forming in part a chamber for holding a container, said housing means including a pair of energy transmission paths for each of said selected cutaway portions for transmitting radiant energy from said source to each of said selected cutaway portions; and
   detection means for and affixed to each of said selected cutaway portions to form a test chamber, each detection means having a first and a second radiant energy detector positioned therein in alignment with a different one of said energy paths when said detection means is affixed to said source housing means, one of said detectors providing a signal manifesting the presence of a container in said formed chamber and the other of said detectors providing a signal manifesting the transmittance thereto of radiant energy of a specific wavelength transmitted through said formed chamber, said specific wavelength being the wavelength specified for the test being performed in that formed chamber.

10. The invention according to claim 9 wherein each of said detection means includes a detector housing and a circuit board affixed thereto having said first and second detectors affixed thereto, said housing including a pair of holes therein, said first and second detectors being positioned on said board to be aligned with said holes, said detectors housing being affixed to a cutaway portion of said source housing so that said holes in said detector housing are aligned with said pair of paths for that cutaway portion.

11. The invention according to claim 10 wherein said detector housing has at least one indention therein on the side thereof remote from said source housing into which said first and second detectors extend.

12. The invention according to claim 10 wherein said detector housing has a pair of cylindrical indentions therein, each having a hole therethrough, each of said detectors being positioned on said circuit board to extend into one of said indentions in alignment with the hole in that indention, said circuit board further having other components affixed thereto which extend into at least one of said indentions.

13. The invention according to claim 12 wherein said other components extend into the indention having said first detector extending therein and said second detector extends into said other indention, said second indention further having a radiant energy filter positioned therein.

14. The invention according to claim 10:
wherein said source housing is a cylindrical polygon with at least portions of selected sides thereof having said cutaway portions therein; and
wherein a detector housing is affixed to each of said selected polygon sides of said source housing.

15. The invention according to claim 14 wherein said chambers formed by each cutaway portion of said source and the detector housing affixed to the sides thereof is an open top parallelepiped.

16. The invention according to claim 15 wherein said detector housing is a singular member having on one side thereof an extended portion which fits into a cutaway portion, said extended portion completing the formation of said chamber, said singular member having on the opposite side thereof a pair of cylindrical indentions each of which has a hole through the bottom thereof to the extended portion, said holes being positioned in said indentions so that when said detector housing is affixed to said source housing, each hole is aligned with one of said paths.

17. The invention according to claim 16 wherein said opposite side of said singular member includes a lip extending therefrom for positioning said circuit board for affixation thereto.

18. The invention according to claim 16 wherein said first and second detectors are affixedly positioned on said circuit board so that they extend into different ones of said cylindrical indentions in alignment with the respective holes through the bottom of said indentions when said circuit board is affixed to said singular member.

19. The invention according to claim 18 wherein other components are further affixed to said circuit board to extend into at least one of said indentions when said board is affixed to said singular member.

20. The invention according to claim 19 wherein said other components and said first detector extend into one of said indentions and said second detector extends into said other indention, said other indention further having a radiant energy filter of a specific wavelength held therein.

21. The invention according to claim 20 wherein said first detector is a phototransistor and said second detector is a P-I-N diode.

22. The invention according to claim 20 wherein said filter is held by an O-ring and said second detector extends into the center of said O-ring.

* * * * *